United States Patent [19]
Rothmeyer

[11] Patent Number: 4,594,856
[45] Date of Patent: Jun. 17, 1986

[54] METHOD AND DEVICE FOR PUMPING HEAT

[76] Inventor: Markus Rothmeyer, Gleiwitzer Str. 28, 8058 Erding, Fed. Rep. of Germany

[21] Appl. No.: 707,847

[22] Filed: Mar. 4, 1985

[51] Int. Cl.$^4$ ............................................. F25B 15/00
[52] U.S. Cl. ..................... 62/112; 62/324.2; 62/476; 62/480
[58] Field of Search ............... 62/476, 480, 112, 324.2

[56] References Cited

U.S. PATENT DOCUMENTS

| | | | |
|---|---|---|---|
| 1,881,208 | 10/1932 | Masterman | 62/480 X |
| 2,276,948 | 3/1942 | Afkleen | 62/480 X |
| 2,319,806 | 5/1943 | Afkleen | 62/480 X |
| 4,138,861 | 2/1979 | Wurm | 62/480 |
| 4,199,952 | 4/1980 | Berg | 62/480 X |
| 4,199,959 | 4/1980 | Wurm | 62/480 |
| 4,410,028 | 10/1983 | Alefeld et al. | 62/480 X |

Primary Examiner—Lloyd L. King
Attorney, Agent, or Firm—Hoffmann, Dilworth, Barrese & Baron

[57] ABSTRACT

A method and device are provided for increasing the temperature of heat. By supplying heat at a temperature $T_2$ to a solid adsorbent, a working fluid is desorbed from this adsorbent at a relatively high pressure. The evolving gaseous working fluid is transformed to a liquid phase at a temperature $T_1'$ ($T_1'$ $T_2$) while liberating heat. The working fluid is then transformed to the gaseous phase at a lower temperature $T_0$ and a lower pressure $p_0$ while heat is supplied. The generated gaseous working fluid is absorbed in a second adsorber/generator in a solid adsorbent. The absorber/generators periodically change between the adsorption and desorption phase and are operated in opposite phases. Before an interchange of the function of the two adsorber/generators, an internal heat exchange is carried out. The internal heat exchange includes a pressure equalization step with a subsequent heat transfer by a heat transfer loop. The use of an absorbent fluid leads to the resorption system which facilitates an optimization of the pressure levels used in the system.

26 Claims, 5 Drawing Figures

RESORBER / DESORBER

ADSORBER / GENERATOR

GAS, DIRECTION OF FLOW

EXCHANGE OF CONTAINERS

EXCHANGE OF CONTAINERS OR LOOP OF ABSORENT LIQUID

METHOD AND DEVICE FOR PUMPING HEAT

BACKGROUND OF THE INVENTION

The following description concerns a procedure for pumping heat. In general, the temperature of heat is increased by using a working fluid which is desorbed at a working fluid pressure $p_1$ from a solid adsorbent contained in at least one adsorber/generator while supplying heat at a high temperature $T_2$, where said working fluid is transformed from the vapor to a liquid phase at an intermediate temperature $T_1$, while liberating heat, where the liquid phase of said working fluid is transformed to a gaseous phase at low working fluid pressure $p_0$ while taking up heat at a low temperature $T_0$, where said gaseous working fluid is adsorbed and liberates heat in at least one further adsorber/generator containing said solid adsorbent, and where the process is continued by alternately (and shifted in phase) desorbing and adsorbing in the two or more adsorber/generators. A heat pump is a device which takes up heat at a low temperature $T_0$ and releases heat at a higher temperature $T_1$. In heat pumps which are based on sorption cycles, the energy input necessary for this process is supplied as heat at a third temperature $T_2$, which is higher than $T_0$ and $T_1$. The heat pumping effect is achieved by the sorption or desorption of a working fluid (in general a gas) in an absorbent material which has a high affinity towards the working fluid.

Sorption heat pumps (also called chemical heat pumps) were first suggested by Altenkirch in 1910 (DE PS No. 427278). Most sorption heat pumps use a liquid as absorbent material and are called absorption heat pumps.

In the simplest system, an absorbent liquid, e.g., aqueous LiBr-solution, is concentrated by heating it to a temperature $T_2$ (e.g. 100° C.) in a generator. A condenser, which is connected to the generator, is kept at an intermediate temperature $T_1$. Due to the heat input part of the working fluid contained in the absorbent, liquid is desorbed in gaseous form in the generator, flows to the condenser and condenses there at a vapor pressure $P_1$ (e.g. 150 mb). The concentration of working fluid in the absorbent liquid in the generator decreases in this process. In continuous systems the concentrated solution is removed from the generator, throttled to a lower pressure and directed to the absorber. The condensed working fluid obtained in the condenser is also throttled to a lower pressure $P_0$ (e.g. 9 mb) and flows into the evaporator. The evaporator is connected to the absorber and is maintained at a low temperature $T_0$. The working fluid vapor present above the liquid working fluid in the evaporator moves to the absorber where it is absorbed in the absorbent liquid which is initially at low working fluid concentration. By pumping the absorbent liquid, which now has a high working fluid concentration, to the generator the cycle is closed. In order to maintain constant temperatures in all components the heat of desorption has to be added in the generator at $T_2$, heat of condensation has to be removed in the condenser at $T_1'$, heat of evaporation has to be supplied at $T_0$ in the evaporator and heat of absorption has to be removed at $T_1$ in the adsorber.

The heat of evaporation is roughly equal to the heat of condensation and the heat of desorption is roughly equal to the heat of absorption. As a rough approximation, one can assume the heat of evaporation to be equal to the heat of absorption (in general, it is larger by a factor of about 1.1 to 1.5). Then the C.O.P. for heating can be estimated as follows: c.o.p.(HP)=ratio of input heat at high temperature $T_2$ to the sum of the heat removed at intermediate temperatures $T_1$ and $T_1'=(1+1)/2=2$. In general the heat taken up in the evaporator is ambient heat, so that the estimated heat gain at $T_1$ (compared to the high temperature input heat) is 100%. In reality this gain is only 30% to 70% due to various losses in the cycle.

The system can be used for cooling as well. In that case the heat uptake in the evaporator is the cooling power and the heat at $T_1$ and $T_1'$ is (in general) rejected to the ambient. The estimated c.o.p. for cooling is 100% while only 50% to 80% are reached in practical applications.

Absorption heat pumps are widely used for commercial air conditioning (mainly in the U.S. and Japan). The application of use of the same process for the upgrading of industrial waste heat is possible (used mainly in Japan). However the use of currently available working fluid/liquid absorbent combinations severely limit the conditions under which these systems can be applied.

The existing combinations which are thermally stable are aggressive fluids (e.g., in the combination sulfuric acid with water as working fluid), operate at high pressures and are poisonous (as water with ammonia as working fluid), or have a very limited temperature range (as LiBr-solution with water as working fluid) due to corrosion and chemical side reactions.

While the use of solid adsorbents was popular in the early days of refrigeration equipment (1920s), they were considered inferior to the liquid absorption systems, which was mainly due to a general lack of regulating equipment and slow reaction rates of the adsorbents used (e.g. $CaCl_2$ with methanol as working fluid).

A very recent development is the use of zeolites, a natural mineral (which can also be produced synthetically) together with water as working fluid.

Certain zeolites can withstand temperatures of more than 300° C. The reaction rate of zeolites with water vapor in an (airless!) container are extremely high. The further development of synthetic zeolites (which are only known for about 40 years) is to be expected with a corresponding improvement of the temperature limit (which is the highest temperature limit of the sorption pairs with the exception of sulfuric acid). Since a solid does not spill from a tank, the application of a solid adsorbent is advantageous especially where high temperatures are involved.

The following papers concern sorption heat pumps with solid adsorbents, especially with zeolite/water as adsorbent/working fluid combination: The German patent application DE No. 2939423 describes a heating system using a solid adsorption cycle with the steps generation—condensation—evaporation—adsorption (of the working fluid).

The European patent EP No. 61888 describes a resorption heat pump with two absorbent solutions (absorption loop and resorption loop) with a solid adsorbent for heat storage in a second stage.

Neither of the above mentioned papers make efficient use of the heat stored at the upper input temperature $T_2$. A large part of this heat is used to heat the adsorbent plus the container and the heat exchangers to the input temperature $T_2$ instead of using the major part of this heat for the generation of the working fluid vapor.

Summary of the disadvantages of existing heat pumps (including solid adsorbent heat pumps):

1. The use of LiBr-$H_2O$ as working pair is limited to temperatures below 160° C. LiBr solution becomes highly corrosive at higher temperatures which requires the use of special, expensive materials at these temperatures. Further, chemical side reactions present a problem for the system LiBr-$H_2O$. LiBr is a rather expensive chemical and is therefore not economical for the storage of energy since large amounts of LiBr-solutions would have to be used.

2. The use of ammonia-water as working pair is limited to temperatures under 180° C. Ammonia dissociates at temperatures above 180° C. Further, the pressures involved become unreasonably high. A condenser temperature of 100° C. requires a pressure of 62.5 bar. Ammonia is poisonous, which limits the use of ammonia-water systems to small sizes or to special locations.

3. The use of sulfuric acid as absorbent with water as working fluid is limited to few cases where acids are handled professionally and specially trained personnel is available as in certain chemical plants. Despite the excellent performance of such systems in the experimental stage, the general use of these systems cannot be recommended.

4. Solid adsorbent systems are operated in a quasi-continuous fashion. Since a solid adsorbent cannot be pumped in a loop, several containers with solid adsorbent must be used out of phase to achieve a quasi-continuous output of heat. The adsorbent is enclosed in relatively large containers, the so-called adsorber-generators, which are used alternatively as adsorber and as generator in a cycle. The solid absorbent has to be heated and cooled in this process together with the embedded heat exchangers and the container material. The application of such systems will in general be limited to pressures below atmospheric pressure.

In a system with two adsorber/generators, the adsorption capacity of each adsorber/generator has to provide output heat over one half cycle of the system. The cycling time has a lower bound due to the thermal masses involved and due to the high cost of additional heat exchanger area which is necessary for faster cycling. Therefore, the mass of adsorbent required per adsorber/generator is quite large (e.g. 800 kg for a 20 kW system). An operation above 1 bar would require large thick-walled pressure tanks. Below atmospheric pressure, the adsorber-generators can be constructed as thin-walled containers with the solid adsorbent supporting the sheet metal walls against the outside pressure. With water as working fluid, the pressure limit of 1 bar limits the condenser temperature of solid adsorbent systems to 100° C.

Additionally, the application of zeolites is limited to a pressure of about 2 bar water vapor pressure due to the poor stability of most zeolites at higher pressure. The use of solid adsorbent in systems like the one described in DE No. 2939423 results in a relatively poor efficiency since the heat necessary for heating of the adsorber-generator to the temperature $T_2$ is not used for the generation of working fluid vapor and does therefore not contribute to the heat pumping process. Instead this heat is used without heat gain at the temperature $T_1$ (irreversible drop of temperature from $T_2$ to $T_1$).

SUMMARY OF THE INVENTION

The purpose of this invention is to increase the temperature range for solid adsorption heat pumps, to improve the efficiency, that means the c.o.p., to increase the amount of heat exchanged in one cycle for a given mass of adsorbent and to make the use of solid adsorbents economical.

The applicability of solid adsorption heat pumps is extended to heat source temperatures ($T_0$) to 100° to 160° C. and to output heat temperatures ($T_1$) of 130° C. to 200° C. Further, the use of non-poisonous materials like zeolite is preferred. The necessary input heat to $T_2$ is used in a very efficient way.

The above mentioned improvements are accomplished in systems according to this invention by means of (1) two or more adsorber-generators (2) subsequent pressure equalization and temperature equalization between the adsorber-generators as an intermediate step between the adsorption phase and the desorption (generation) phase.

And, optionally in the preferred version of the invention:

(3) an absorbent fluid in the evaporator and/or the condenser for the operation as desorber and/or resorber.

Application of the procedures described in this patent results in the following improvements:

(1) The sensible heat of the adsorber/generator (which is at a high temperature $T_2$ after the regeneration phase) is used to preheat the second adsorber/generator which is at a lower temperature $T_1$ after the adsorption phase.

The preheating is carried out in two steps:

(a) the two adsorber/generators are connected and the working fluid pressure between the two equalizes. This results in further desorption of working fluid and simultaneous cooling in the first adsorber/generator. The generated working fluid vapor is adsorbed in the second adsorber/generator (which raises the temperature of the adsorbent due to the heat of adsorption). During this step the adsorber/generators are not connected to the heat sources and sinks used in the normal operating mode.

(b) the adsorber/generators are brought in thermal contact via a heat transfer loop or other heat exchange means. The temperature of the two adsorber/generators approaches a mean temperature $T_M$.

As a consequence of this two-step procedure, the regenerated adsorbent in the first adsorber/generator is regenerated (dried) to a higher extent, while the second adsorber/generator takes up more working fluid. Therefore, the amount of working fluid which is adsorbed and desorbed in one adsorption cycle is increased. Further, the heat required to heat the saturated adsorbent in the second adsorber/generator to the final regeneration temperature $T_2$ decreases considerably.

(2) If the temperatures and pressures can be suitably chosen, a further improvement of the cycle efficiency is achieved. If the pressure in the adsorber/generator which is being preheated is higher at $T_M$ than the resorber (condenser) pressure, one can dry the adsorbent further during step (2) by opening the adsorber/generator to the resorber. Independently, an analogous step can be used to generate vapor in the desorber (evaporator) and to adsorb working fluid in the other adsorber/generator if its working fluid pressure falls below the value of the desorber pressure. In this case, the resorber and/or the desorber are connected to the corresponding heat sink/source.

The preferred versions of the described method and devices have the following advantages over existing systems:

(1) the possibility to utilize heat sources above 100° C.

(2) the possibility to provide output heat at temperatures around 200° C.

(3) the upper pressure $P_1$ can be limited to 1 bar, which allows the construction of the adsorber/generators as lightweight containers. The sheet metal is supported by the adsorbent itself in this case.

(4) limitation of the pressure to a value below the stability limit of the adsorbent in cases where such a limit prevents the use of this adsorbent in a regular adsorption cycle without resorption loop.;

(5) two additional degrees of freedom of the process, namely the absolute concentration and the concentration change of the absorbent fluid circulating between desorber and resorber. This allows a better matching of the heat pump process to the heat sources and heat sink conditions. An an example, the concentration change in the solid adsorbent per cycle can be optimized by choosing a suitable concentration in the resorption loop. The process is thus shifted to a pressure range where the solid adsorbent has a greater concentration change per cycle.

(6) the heat is transferred in a temperature interval in the resorber and desorber instead of at a fixed temperature as in the condenser and evaporator. This results in a more efficient use of heat exchanger area if a heat source/sink is used which carries mainly sensible rather than latent heat.

DETAILED DESCRIPTION

Figure 1:
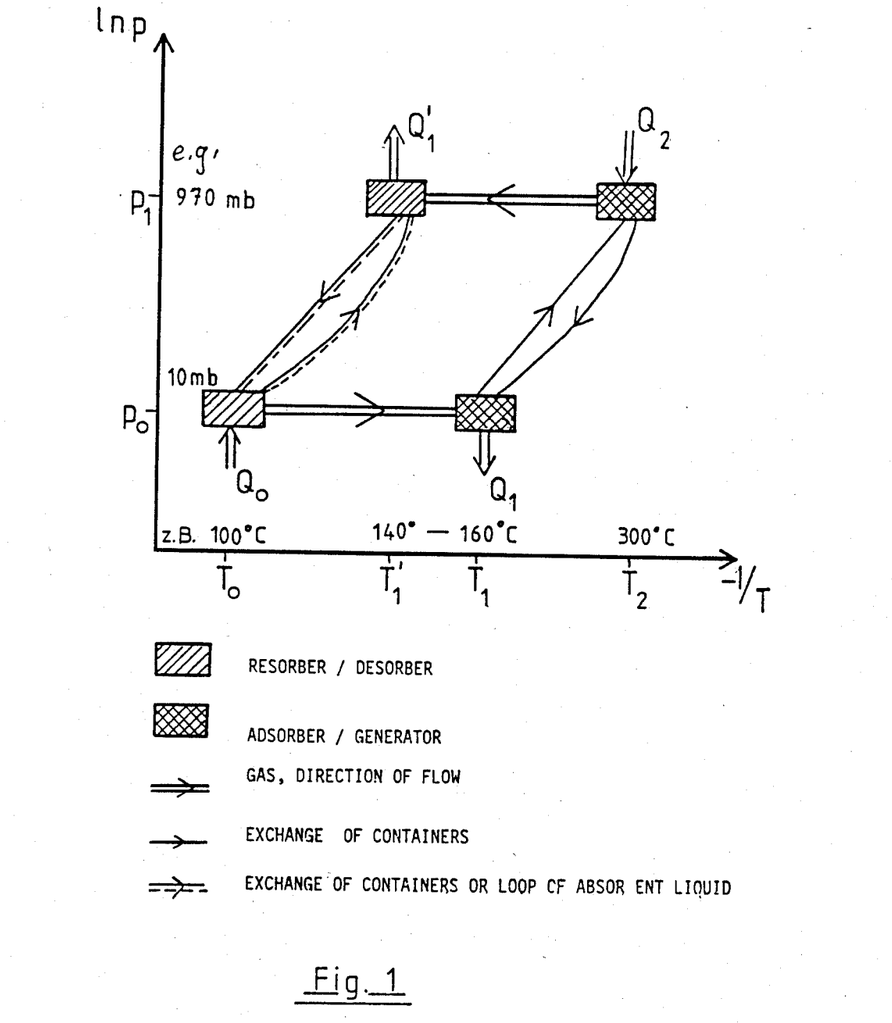
FIG. 1—Basic heat pump cycle. Working fluid pressure and temperature in a sorption heat pump.

FIG. 1 shows the relation of temperature and working fluid pressure in a general sorption heat pump cycle. Due to evaporation of the working fluid at a low pressure $P_0$, heat $Q_0$ (e.g. waste heat or ambient heat) at the temperature $T_0$ is taken up in the evaporator. The gaseous working fluid flows to the adsorber/generator where it is adsorbed at the temperature $T_1$ while liberating the heat of sorption at the temperature $T_1$. This heat leaves the system (e.g. as output heat for a chemical process).

Simultaneously a second adsorber/generator is regenerated at the temperature $T_2$ by supplying the heat $Q_2$. The desorbed working fluid flows to a container where it is converted to a liquid phase while the heat $Q_1'$ at temperature $T_1'$ is produced (used as output heat). This process cannot continue indefinitely since only a finite mass of adsorbent is present in each adsorber/generator. Once the adsorbent in the adsorber/generator at the temperature $T_1$ and pressure $p_1$ is saturated under the given conditions, the two adsorber/generators are interchanged and the process can start over again. The working fluid in the container for phase change at $p_1$ (which is now in a liquid phase) is directed to the other phase change vessel (in the following called desorber, which shall include the case of an evaporator) which is at a lower pressure $p_0$.

The containers for the phase change of the working fluid can either be a condenser+evaporator or a resorber+desorber or a combination resorber+evaporator or condenser+desorber in cases where the system is used in an open process (with exchange of absorbent liquid or working fluid to external (e.g. chemical processing)) equipment.

The heat exchangers used in commercial liquid absorbent heat pumps for the heat exchange between hot absorbent liquid with low working fluid concentration, and cooler absorbent liquid with low working fluid concentration cannot be used for solid adsorbents.

To accomplish an efficient heat exchange between hot regenerated adsorbent and cooler, saturated adsorbent a combined internal heat and mass exchange method is described herein.

Figure 2:
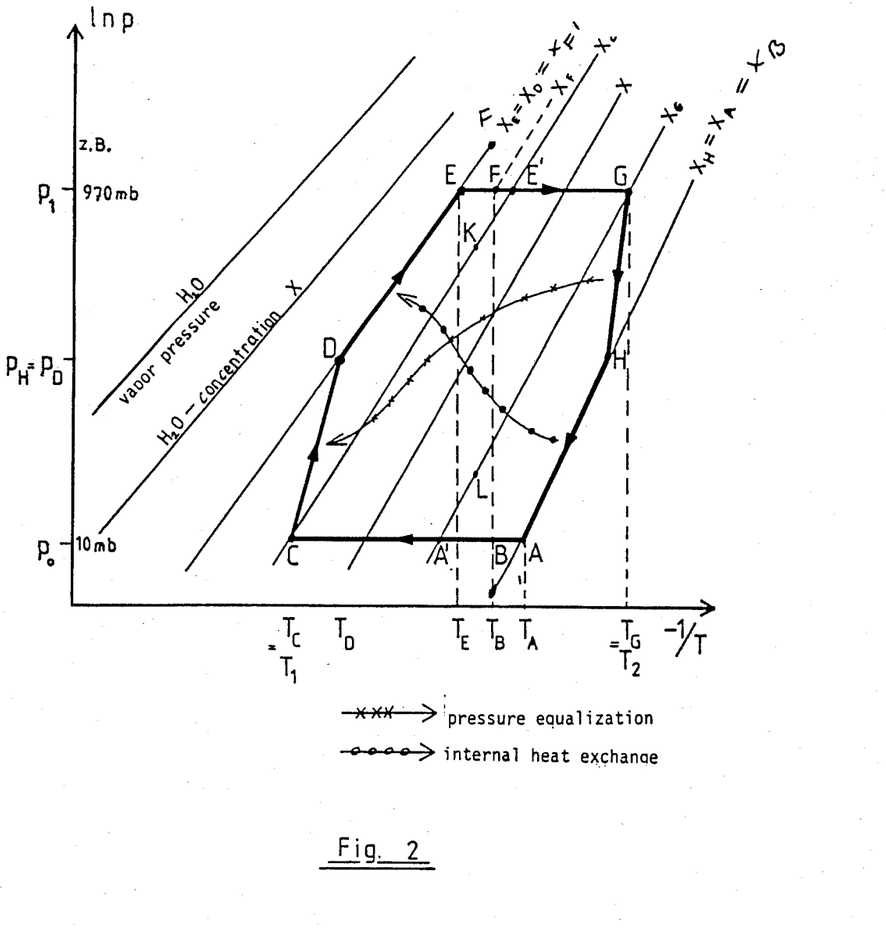
FIG. 2—Working fluid pressure and temperature for two adsorber/generators which operate in opposite phases with internal mass and heat exchange.

FIG. 2 shows the relation of temperature and working fluid pressure during the process of internal mass and heat exchange between the two adsorber-generators. The b lnp-1/T scaling of the diagram reduces the curve for a pure working fluid (e.g. water) approximately to a straight line. The vapor pressure of an adsorbent at constant concentration or working fluid reduces to a straight line as well (e.g. line $x_G$). FIG. 2 shows a heat pump process for water as working fluid and zeolite as adsorbent. Point G shows the condition of adsorber/generator I after the regeneration step. The working fluid concentration $x_g$ is determined by the temperature $T_2$ and the pressure $p_1$. Point C shows the condition of the adsorber/generator II after the adsorption cycle.

A simple heat exchange between the adsorber/generators I and II would lead to the process C-K or G-L respectively. The specific sorption capacity of the system is proportional to the change of working fluid concentration between in the containers I and II.

$$\Delta x = x_G - x_C,$$

where $x_G = x_a'$ and $x_C = x_E'.$

Thus the sorption capacity does not increase with this method. However, the c.o.p. is improved, since the amount of heat necessary for heating the adsorber/generator to $T_2$ is smaller (heating with input heat is only necessary from $T_k$ to $T_2$ instead of from $T_1$ to $T_2$).

The preferred method is different:

After disconnecting the adsorber/generators from the heat source and sink at $T_2$ and $T_1$, respectively, the pressure is equalized between the adsorber/generator I and II. In this process the adsorber/generator II moves from point G to point H. That means it is regenerated further and the working fluid concentration changes from $x_G$ to $x_H$. Simultaneously the working fluid desorbed in container II is adsorbed in the adsorber/generator I and changes the state of adsorber/generator I from C to D. The final condition of the two adsorber/generators is given by the condition $p = p_H = p_D$.

After the pressure equalization step the connection between the adsorber/generators is interrupted. The two adsorber/generators are now brought in thermal contact, e.g., by a heat exchanger loop. This changes the position of adsorber/generator I from D to F' and adsorber/generator II moves from H to B'.

This process increases the sorption capacity of the heat pump. The effective working fluid concentration change is now $\Delta x = x_F' - x_G$ while it was $\Delta x = x_G - x_E'$ before (in the case without any internal heat exchange). That means for the same mass of adsorbent, the capacity of the heat pump is increased. Further, part of the heat necessary for heating container I was recovered from adsorber/generator II and does not have to be supplied from the external source at $T_2$.

Depending on the choice of $p_0$, $p_1$ and the temperatures $T_1$ and $T_2$, the above described procedure can lead to a further improvement:

If the pressure in container I exceeds $p_1$ in the internal heat exchange step (point E) and the pressure in container II drops below $p_0$ then the containers I and II can be connected to the resorber and the desorber respectively and a partial regeneration/adsorption can be accomplished without supplying heat at the input heat temperature $T_2$.

The final condition of the internal mass and heat exchange is then given by $T_F = T_B$, $p_I = p_0$, $p_{II} = p_1$.

This method results in a considerable increase of the c.o.p. since the amount of input heat per unit output heat at $T_2$ necessary for the regeneration is much smaller than without the internal heat and mass exchange.

Figure 3:
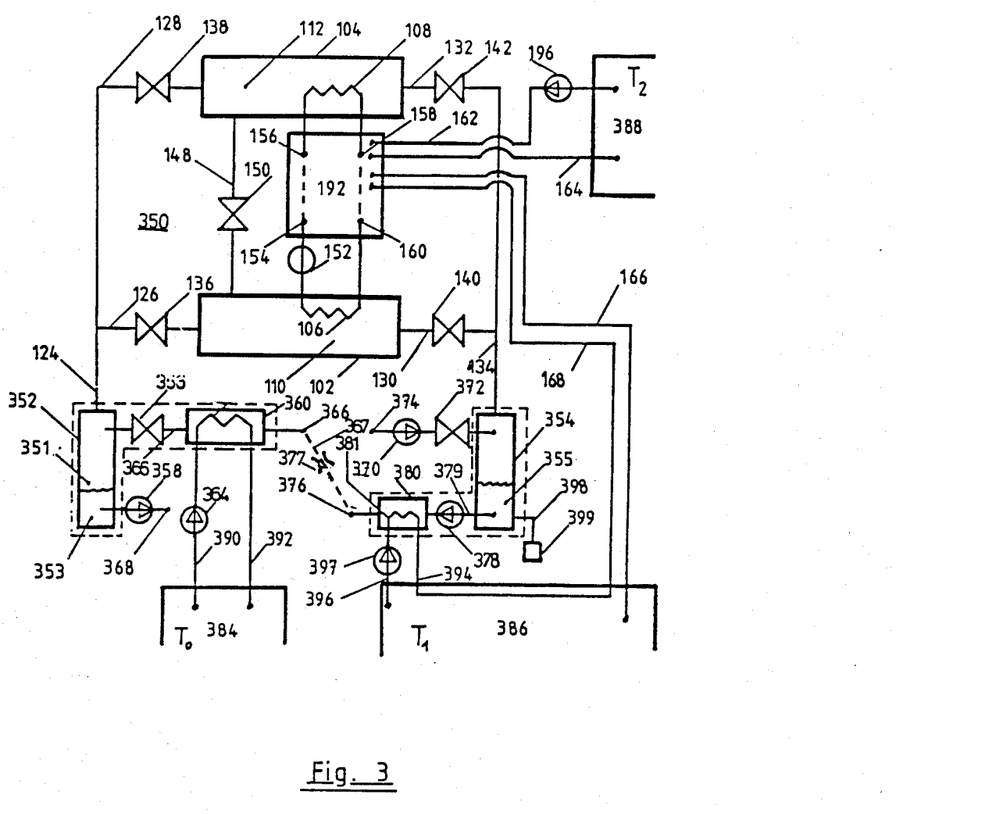
FIG. 3—Sorption heat pump with resorber (condenser) and desorber (evaporator)

FIG. 3 shows the heat pump system as described in this patent in its simplest form (350).

The main components of the heat pump are the two adsorber/generators (102) and (104) with the heat exchanger (106) and (108) respectively and a mass of adsorbent (110) and (112), respectively. The adsorber/generators are connected via the pipes (126) and (128) to the common duct (124) to the desorber (352). A second pair of pipes (130) and (132) connects the adsorber/generators (102) and (104) to a common duct (134) to the resorber (354).

Further, the heat pump (350) includes the valves (138), (140), (142), (136) in the ducts (128), (130), (132), (126). The pipe from the valve arrangement (192) to the heat exchanger (106) contains a pump (152). The valve arrangement (192) is connected via the pipes (154), (156), (158), (160) with the heat exchanger (106) and (108) in the adsorber/generator (102) and (104). Further the valve arrangement (192) is connected via the pipes (162) and (164) with the high temperature ($T_2$) heat source (388) and via the pipes (166) and (168) with the heat sink (user) (386) at the temperature $T_1$.

Table 1 shows the connection matrix of the valve arrangement (192). Advantageously the pipe (168) goes from the heat sink (386) via the pump (397) to the heat exchanger element (381) in the resorber part and from there to the valve arrangement (192). The pipe (162) from the valve arrangement (192) to the heat source (388) contains the pump (196).

The heat exchanger (360) is advantageously placed in the desorber loop and is connected with the low temperature heat source (384) via the pipes (390) and (392). The pipe (366) for adsorbent fluid (366) leads via the heat exchanger (360) and the valve (356) to the desorber (352).

The resorber (354) incorporates a pipe (374) for absorbent fluid with high working fluid concentration, e.g., coming from a chemical plant. The pipe (374) contains a pump (370) and a valve (372). The drainpipe (379) contains a pump (378) and a heat exchanger (380).

Advantageously a device (399) for purging the system of gases other than the working fluid is connected via the pipe (398) with the resorber (354). Preferentially the heat exchanger element (381) is connected to the heat sink (386) via the pipe (396) containing a heat transfer medium.

For the operation of the heat pump (350) three temperature levels $T_0$, $T_1$ and $T_2$ are necessary. At the temperatures $T_0$ and $T_2$, heat is supplied to the heat pump. At the temperature $T_1$, heat is available which is supplied to the heat sink (user) (386).

In the case of cooling applications, the useful heat uptake at temperature $T_0$ is utilized while the heat at temperature $T_1$ is usually rejected.

Further, the use of the desorber (352) requires a stream of absorbent fluid (e.g., aqueous LiBr solution) with high working fluid concentration. A second stream of absorbent fluid is necessary which flows through the resorber (354). The heat pump is operated discontinuously, that means one adsorber/generator is regenerated while the other one is adsorbing until the final concentration is reached. Preferentially this step is followed by the internal mass and heat transfer between both adsorber/generators. Subsequently the operation is continued with the adsorber/generators now being again in opposite phases with reversed connections to the desorber and resorber.

After adsorption/desorption to the final concentration the internal heat and mass exchange is repeated. Then the process can start again. The cyclic use of two adsorber/generators in opposite phases results in a quasi-continuous operation. During the internal heat and mass exchange the heat output can be buffered with storage tanks. Alternatively, three or more adsorber/generators can be used to achieve a constant heat output.

In operation the valve arrangement (192) alternately connects the adsorber/generator (106) or (108) with the heat source (388) for regeneration or with the heat sink (user) (386) during the adsorption. The valves (136), (138), (140), (142) are operated in a way that the adsorber/generator connected to the heat source (388) exchanges working fluid with the resorber, while the other adsorber/generator (coupled to the heat sink (136)) exchanges working fluid with the desorber (352). The detailed sequence of steps and the function of the valve arrangement (192) is shown in Table 1.

The working fluid adsorbed in the adsorber ((102) or (104)) is generated in the desorber (352). Due to the adsorption of working fluid in the adsorber, the working fluid pressure in the desorber decreases. Therefore, more working fluid is desorbed from the absorbent solution in the desorber. The heat necessary for the desorption process comes from the sensible heat of the absorbent fluid. Thus, the absorbent fluid cools down in the desorber (352). The cooled absorbent fluid is moved to a chemical process preferentially with a pump (358) and a pipe (368). The heat generated during adsorption in the adsorber/generator (102/(104) is supplied to the heat sink (user) (386).

During the desorption phase, the generated working fluid in the other adsorber/generator is absorbed in the resorber (354). The absorbent fluid in the resorber is not necessarily the same as in the desorber.

Due to the heat supplied to the adsorber/generator (102)/(104) in the generating phase, the working fluid pressure rises and the absorbent fluid in the resorber (354) absorbs working fluid. The liberated heat of absorption causes a temperature rise of the absorbent fluid. This heated fluid is preferentially pumped to a heat exchanger (380) by means of a pump (378). In the heat exchanger, the generated heat of absorption is transferred to a heat sink (user) (386). Alternatively, the hot absorption fluid in pipe (379) can be supplied directly to an industrial process.

The preferred type of heat pump includes the internal mass and heat exchange between the two adsorber/generators (102)/(104). The heat exchange is accomplished via a heat exchanger loop (154)–(160), (106), (108). The preferred way of connecting the heat exchangers (106) and (108) is that the hot end of the hotter adsorber/generator is connected to the hot end of the other adsorber/generator and the heat transfer fluid leave the hot adsorber/generator at the hotter end.

In the following, the heat pump (350) is described in its most general form together with the internal mass and heat exchange. The internal mass and heat exchange can also be applied to systems where the desorber (352) and the resorber (354) are operating as simple evaporator and condenser. This case is shown by the dashed lines in FIG. 3. The heat exchangers (360) and (380) are in this case integrated into the container (352) and (354). The components (358), (356) and the pipes (368), (366) are not necessary for an operation with an evaporator.

For the operation with a condenser instead of a resorber, the components (378), (372), (370) and the pipes (379) and (374) can be left out. The operation of the heat pump, as closed system with condenser and evaporator, further requires a connection of pipe (376) with (366) to recirculate the condensed working fluid to the evaporator. Preferably a throttle (377) or an expansion device, e.g., a turbine is used in this pipe to reduce the pressure from $p_1$ to $p_0$ and to control the flow.

The preferred model of the heat pump uses an absorbent fluid in at least one of the components (352) and (354). The connection to the heat sink (386) as shown in FIG. 3 is especially advantageous for high temperature heat pumps. The heat transfer fluid flows first through the resorber (354) which is at a relatively low temperature. The maximum temperature is reached in the adsorber/generator (102)/(104). This arrangement leads to a lower temperature in the resorber (354) compared to parallel operation of the adsorber/generator and the resorber or a serial operation with reversed flow of the heat transfer medium. This is important for high temperature applications since most absorbent fluids are limited in their temperature range. The maximum temperature is reached in the adsorber/generator (102)/(104). The solid adsorbent (e.g., zeolite) is subject to the highest temperatures in the process.

The preferred solid adsorbent is zeolite. Zeolites are crystalline alumosilicates with microscopic pores. Due to the large internal surface area, large amounts (up to 40% of the total dry weight of the zeolite) of gases or liquids can be adsorbed.

Zeolites are well suited for heat pump applications since they are thermally stable, cheap to manufacture, non-hazardous and present no problem to the environment (mineral-like material). The synthetic zeolites of type A and also the types X and Y are the preferred materials. The best results have been obtained with magnesium exchanged A-type zeolite. For very high temperatures the zeolites "silicalite" or "ZSM" can be used as adsorbent.

Activated charcoal is the second preferred adsorbent, especially in combination with organic working fluids like methanol.

The preferred working fluid is water. In combination with zeolite as adsorbent high energy densities are obtainable in the heat pump system. Water is preferred due to its low price and the non-hazardous properties. Further, the physical and chemical properties of water are known in detail.

The preferred absorbent fluids in the resorber and desorber are aqueous salt solution. Aqueous salt solutions are being widely used as absorbent fluids in commercial refrigeration equipment. The physical and chemical properties are known and extensive experience in the application of these fluids exists. The thermal stability is sufficient for the operation of the resorption loop of the system described here.

Particularly well suited are aqueous LiBr—, LiCL—, $CaCL_2$—, NaCl—, or ZnBr-solutions. They can be used as mixtures for the modification of physical properties like the viscosity, the vapor pressure or the corrosivity.

The use of a resorption system is advantageous if solid adsorbents with low thermal stability at high working fluid pressures are to be used in a heat pump. The reduction of the working fluid pressure in a resorption system facilitates the use of adsorbents which degrade under the conditions of a regular adsorption cycle with the evaporator/condenser. Alternatively, adsorbents which are cheaper to produce (but not stable at higher vapor pressures) can be utilized with this method, e.g., for low temperature applications.

The preferred condition of operation of the heat pump (350) is the pressure range below 1 bar absolute pressure. This pressure range is to be preferred since the adsorber/generators can be built as lightweight containers with thin walls. The adsorbent solid in the containers is used as support for the walls. The outside atmospheric pressure is carried by the adsorbent material itself in a fashion similar to a vacuum package (e.g. peanuts packaged in an evacuated plastic bag).

Preferred is the use of the additional degrees of freedom of a resorption process to optimize the sorption capacity of the system.

The number of available adsorbents is limited. Some adsorbents are better suited at higher temperatures while others degrade under the same conditions. In many cases adsorbents (e.g. zeolite Mg-A) have marked regions in a pressure-temperature diagram where their adsorption capacity per unit temperature or pressure change is a maximum. For systems with evaporator and condenser, this property of an adsorbent already determines the preferred operating temperatures for one particular working fluid. The use of a resorption loop provides a higher flexibility since the concentration of the working fluid in the absorbent fluid plus the kind of absorbent fluid are open parameters. Thus the resorption system allows an optimization of the sorption capacity of the heat pump for a given mass of adsorbent, a given cycling time and given temperatures of the heat sinks and sources.

Further, the resorption system (350) can be used as an open system (in contrast to the closed loops described above) where it is used for the simultaneous concentrating and cooling and/or diluting and heating of solutions (especially aqueous solutions) in the chemical or food production industry.

Preferably, an internal mass and heat exchange step is used before the function of the two adsorber/generators (102) and (104) is interchanged.

The preferred procedure of the internal mass and heat exchange is as follows:

The adsorber/generators I and II are disconnected from the heat source (388) and sink (386) respectively. Then, a pressure equalization between the two adsorber/generators is accomplished. The valve (150) between the initially hot ($T_2$) adsorber-generator I (point G in FIG. 2) and the adsorber/generator II which is initially at a temperature $T_1$ (point C) is opened. The decrease of working fluid pressure in adsorber/generator I causes working fluid vapor to be generated while the adsorbent in I is cooling down due to the heat of desorption necessary in this process. The generated gaseous working fluid flows to the adsorber/generator II where it is adsorbed. The heat of adsorption leads to an increase of the temperature in adsorber/generator II. The process terminates as soon as the working fluid pressure in I and II are equal. FIG. 2 shows this process: I moves from G to H and II moves from C to D.

In the next step, the heat transfer loop (154)–(160), (106) and (108) is used to equalize the temperature of the two adsorber-generators I and II. For this process the valve (150) is closed. The transport of heat from I to II ends when both adsorber/generators have the same temperature $T_B$ (see FIG. 2). Due to the temperature change in the adsorbent, the working fluid pressure in the two adsorber/generators changes. Container I moves from H to B', and II moves from D to F'.

If the working fluid pressure in container I falls below $p_0$, the pressure in the desorber (352), then the valve (136) or (138) to the desorber (352) can be opened and the process in container I continues along a constant pressure curve. The heat of adsorption generated in the adsorbent in the adsorber/generator I is transferred to II via the heat transfer loop.

Similarly, if the pressure in container II rises above $P_1$, the valve (132) or (140) can be opened and working fluid vapor can flow to the resorber (354). The process in container II then follows a constant pressure curve (E to F in FIG. 2). The final condition of the internal heat transfer is given by the point when both containers reach the same temperature, $T_B$ (point B in container I and point F in container II).

The whole procedure does not require heat input from external sources. As a result, the c.o.p. and the capacity of the heat pump cycle is considerably improved by this method, especially if the steps A–B and E–F can be used in the process.

During the operation of the heat pump system, large volumes of working fluid vapor flow through the channels in the solid adsorbent (e.g. granulated zeolite). The resulting pressure drop in the adsorber/generators influences the adsorption of working fluid.

The preferred system uses a flow direction of the heat transfer fluid in the adsorber/generator during the adsorption phase which is opposite to the direction of vapor flow in the adsorbent. Thus, the heat transfer fluid leaving the adsorber/generator during the adsorption phase is in thermal contact with the solid adsorbent which is subjected to the highest working fluid pressure and which consequently reaches the highest temperature.

Further, the heat exchangers can be operated in sections such that the heat transfer fluid leaving the adsorber/generator is in thermal contact with a portion of the adsorbent which is still at a high temperature. If the temperature of this portion of the adsorber/generator decreases below a certain level then a further (fresh) section of the adsorber/generator is used as heat source by switching the heat exchanger connections. The heat exchangers (106) and (108) have to be divided into sections for this procedure. These sections can be operated separately e.g. by several three-way valves.

A preferred variation of the heat pump system includes the use of external heat exchangers. This allows the use of commercially available heat exchangers and/or the use of heat exchangers at some distance from the location of the heat pump, which is desirable in some applications. A separate heat transfer loop can be avoided by this method.

In the following, a heat pump system which can be used in the above described ways is described in detail.

The adsorber/generators (102), (104) are used alternatively as adsorber and generator. Two (or more) adsorber/generators are used in a cycle in such a way that at least one is in the adsorption phase while at least one is in the generating phase (with the exception of the time necessary for the internal mass and heat transfer step).

The adsorber/generators (102), (104) contain a solid adsorbent (110), (112) e.g., in form of a granulate, as solid plates, porous structure or as blocks with channels.

Commercial heat exchangers like finned tubes, plate-type heat exchangers, stamped sheet metal plates with incorporated tubes etc. or a system using evaporation and condensation can be used for heat transfer. The heat exchange means include a valve arrangement with the pipes (154)–(160) and heat exchanger elements (106) and (108) in the adsorber/generators (102) and (104).

An absorbent fluid is used in the resorber (354) and in the desorber (352). It serves to absorb and desorb working fluid vapor.

Since a solid adsorbent is used, the adsorber/generators (102) and (104) the operation of the heat pump is discontinuous.

During the first phase one adsorber/generator (e.g. (102)) is connected with the resorber (354). By supplying heat to (102) at the temperature $T_2$ ($T_2 T_1 T_0$), working fluid is desorbed from the solid adsorbent and resorbed in the absorbent fluid in the resorber (354). Simultaneously, the other adsorber/generator (104) adsorbs working fluid vapor which is desorbed from the absorbent fluid in the desorber (352). The absorbent fluid in the desorber cools down and takes up heat from a heat source at temperature $T_0$ in the process while the heat of adsorption generated in the adsorber/generator (104) is supplied to a user at the temperature $T_1$. When the adsorber/generators (102) and (104) are at the final conditions given by the temperatures $T_0$, $T_1$, $T_2$ and the pressures $p_0$ and $p_1$ in the desorber and resorber respectively, the method of internal mass and heat exchange is applied. First the adsorber/generators (102) and (104) are disconnected from the heat source (388) and sink (386) respectively. Part of the sensible heat of the adsorber/generator (102) is then transferred to the adsorber/generator (104) which is initially at the temperature $T_1$. This is accomplished by the pressure equalization pipe (148), the valve (150) and the heat transfer loop (152-160) (192), (106), (108). After the internal mass and heat transfer step, the adsorber/generators are connected to the heat source and sink (102) is now connected to the heat sink (386) while (104) is connected to the heat source (388). Since both adsorber/generators are identical, the further operation follows from the above. The switching of the connections to the heat source and sink as well as the heat transfer loop between the adsorber/generators during the internal heat exchange is performed with a valve arrangement (192). The operation is described in detail in Table 1. Additionally, the valves (136), (138), (140) and (142) have to be opened and closed such that the adsorber/generator which is being regenerated is only connected to the resorber (352) while the adsorbing adsorber/generator is only connected to the desorber.

The valve arrangement (192) is a preferred device and can either consist of a number of simple valves or a combination of three- or more way valves which are arranged and operated as to result in the connection matrix of Table 1.

A preferred version of the heat pump (350) includes so-called exchange-columns as resorber (354) and desorber (352) This is especially advantageous if the gaseous working fluid leaving the desorber (352) still contains a small amount of absorbent fluid and has to be rectified. The rectification can be accomplished in a rather simple fashion in an exchange column consisting of a rectification and a desorption section.

Further, the heat pump shown in FIG. 3 can be modified to include more than 2 adsorber/generators. This is necessary if a strictly continuous heat output is to be achieved without external buffers. To avoid an interval of zero heat output during the period of internal mass and heat exchange, four adsorber/generators can be used. All four adsorber/generators are then operated in different phases according to Table 1. The adsorber/generator undergo the different operating phases in a cyclic fashion.

The valve arrangement (192) has to be modified according to the conditions given by Table 1 for the operation of four adsorber generators.

A preferred version of the heat pump includes means for a sectionwise heat exchange, adsorption and desorption. A sectionwise adsorption minimizes heat losses and leads to a more efficient use of the adsorbent material since only part of the adsorbent has to be at the output temperature $T_1$ while the rest of the adsorbent can produce heat at a lower temperature (which can be as low as the temperature of the heat transfer fluid returning from the user). This results in a lower mean average temperature in the adsorber/generator at the end of the adsorption phase and thus in a higher concentration of working fluid in the adsorbent. This procedure is especially useful in combination with the method described of subdividing the inside of the adsorber/generators into sections with different vapor pressure. For best use of the adsorbent capacity of the solid adsorbent, the heat transfer fluid of the heat sink (386) loop flows only through a portion of the adsorber at the beginning of the adsorption phase. As soon as the temperature $T_1$ (desired output temperature) can no longer be reached in this portion of the adsorber due to saturation of the adsorbent, the heat exchange loop is extended or switched to a further section of the adsorber which is still at a high temperature and contains freshly regenerated adsorbent. This can be repeated until the whole adsorber (all sections) are at a temperature below $T_1$ and saturated with working fluid. Then the adsorption phase is completed.

Another method to accomplish a sectionwise adsorption is to divide the vapor space inside the adsorber/generator into sections with different working fluid pressure which can be separated by flaps, valves or other means.

Figure 4:
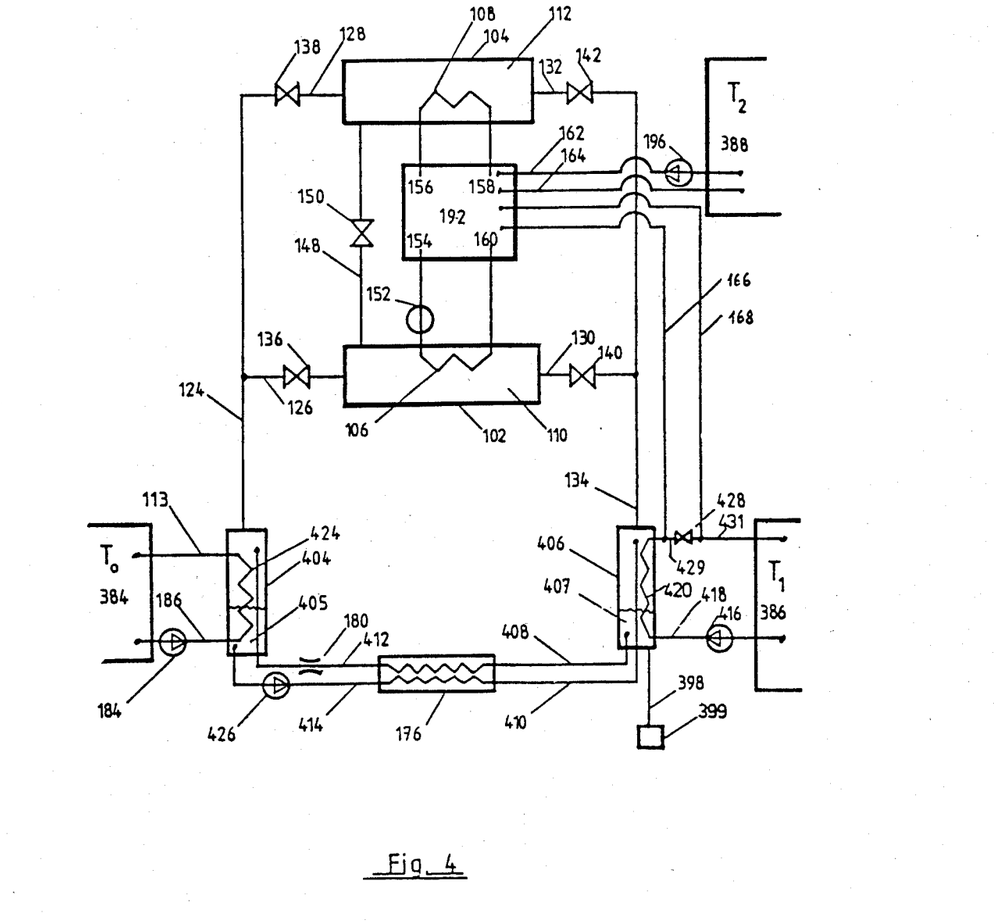
FIG. 4—Sorption heat pump with resorption loop and solution heat exchanger

FIG. 4 shows a sorption heat pump with a resorption loop containing a solution heat exchanger. The basic system is the same as shown in FIG. 3. Equivalent devices are labeled with equal numbers. The variations are restricted to the resorption loops.

The desorber (404) contains a heat exchanger (424), which is connected via the pipes (113) and (186) to the heat source (384). A pump (184) in the pipe (186) serves to circulate the heat exchange medium through the heat exchanger (424). The desorber (404) further incorporates a pipe (414) with a pump (426) which is connected to a solution heat exchanger (176). The absorbent fluid with low working fluid concentration flows through pipe (414), the solution heat exchanger (176), the pipe (410) and the resorber (406).

The resorber (406) is equipped with a heat exchanger (420) which is connected via a pipe (418) and a pump (416) to the heat source (386). The heat exchange fluid in this loop flows back to (386) via the pipe (431). The pipes (168) and (166) connect the pipe (431) to the valve arrangement (192). The pipes (168) and (166) are interconnected by the pipe section (429) which contains a valve (428).

The absorbent fluid with high working fluid concentration flows through pipe (408) from the resorber (406) to the solution heat exchanger (176) and from there through a throttling device (180) and the pipe (412) into the resorber (404). Advantageously a purging device (399) for the removal of gases other than the working fluid is used, which is preferentially connected to the resorber (406) via the pipe (398).

The resorption loop of this heat pump is closed. This can be derived from FIG. 3 by connecting the pipes (366) with (376) and (374) with (368) and installing the solution heat exchanger (176) in the connecting pipes.

During the operation of the heat pump, absorbent fluid circulates through the resorber (406) and the desorber (404). In the desorber part of the working fluid contained in the absorbent liquid is desorbed. In the resorber the absorbent liquid absorbs working fluid vapor coming from the adsorber/generator. Thus, the amount of working fluid removed from the absorbent in the desorber is replaced in the resorber.

Two heat sources (384) and (388) are necessary for the operation of the heat pump. The low temperature heat source (384) at $T_0$ can be waste heat from an industrial process or ambient heat etc. The high temperature heat source can, e.g., be a gas or oil burner. The output heat is available at an intermediate temperature $T_1$. In general, the ratio of output heat ($T_1$) to input heat ($T_2$) obtainable with the system is about 1.5.

The following variations of the described heat pump system refer especially to FIG. 4.

The preferred resorption loop contains a counterflow solution heat exchanger (176) for the heat exchange between the absorbent fluid with low working fluid concentration leaving the desorber (404) and the absorbent fluid with high working fluid concentration leaving the resorber (406).

To reduce the pressure, a device (180) is included in pipe (412) which transports absorbent liquid with low working fluid concentration from the desorber (404) to the resorber (406). This device can be a simple throttle, a capillary or a turbine which supples the shaft power to a generator or to a pump (e.g.(426) in pipe (414)). This device is preferably installed between the storage tank (468) (see FIG. 5) and the desorber (404). Thus the storage tank is subjected only to a small pressure difference between inside and outside ($.p = p_{atmosphere} - p_1$).

Figure 5:
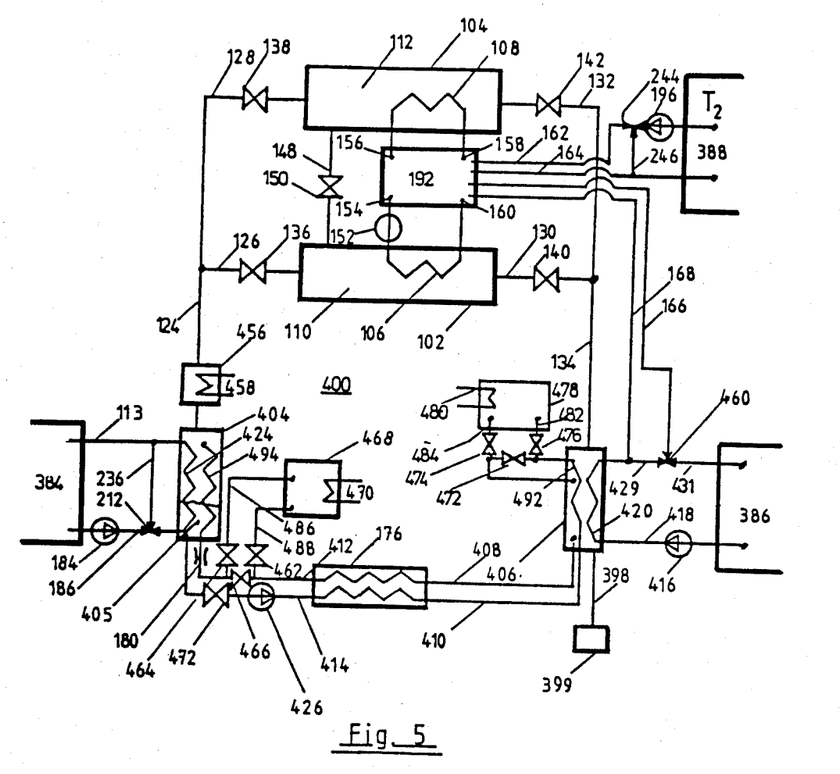
FIG. 5—Sorption heat pump with resorption loop, solution heat exchanger and storage tanks for absorbent liquid of high and low working fluid concentration.

FIG. 5 shows a more heat pump according to FIG. 4 which includes storage tanks (468), (478) which act as a buffer during the internal heat and mass exchange period or during other periods when output heat is needed without using the adsorber/generators.

The pipes (113) and (186) to the heat exchanger (424) are connected with a pipe (236) and a three-way valve (212) in the pipe (186) which regulates the heat production of the desorber. The feed pipe (412) is preferably connected to a heat exchanger element (494) in the desorber (404).

Preferably a regulating three-way valve is included at the connection of the pipes (166) and (429).

The feed pipe (410) to the resorber (406) is preferably connected to a heat exchanger element (492).

A storage tank (468) for absorbent liquid with high working fluid concentration is connected via the pipes (488) and (486) to the pipe (412) at points before and after (in the direction of flow) the valve (466) respectively. Preferably a heat exchanger element 470 in the storage tank (468) is used to heat the absorbent liquid. (384) can be used as heat source for this purpose.

A second storage tank (478) is preferably connected via the pipes (484) and (482) to the pipe (410) at point before and after the valve (472) in the direction of flow.

A heat exchanger element (480) is preferably included for heating of the absorbent liquid in this tank.

By including the storage tanks (868), (478) the heat pump (400) can serve as energy storage system. The storage capacity is given by the size of the storage tanks. In the storage mode heat of low temperature $T_0$ from the heat source (384) is pumped to an intermediate temperature $T_1$ without using the heat source (388) during the heat output period. The desorber (404) is fed with absorbent liquid with high working fluid concentration from the storage tank (468). This liquid was stored there during the desorption phase of the solid absorbent. The absorbent liquid with low working fluid concentration produced during the adsorption in the adsorber/generator is stored in the tank (478). During a later period, when heat from the heat source (388) is available, the absorbent liquid from tank (478) is used in the resorber (406) to absorb working fluid generated in the absorber/generator (102) or (104). The resulting absorbent liquid with high working fluid concentration returns to the tank (468). In this operating mode the adsorber/generators can be operated both in the same phase rather than in opposite phases.

The system described in FIG. 5 facilitates the following modes of operation:

The heat exchangers (470) and (480) can be used to maintain a temperature of $T_0$ and $T_1$ in the tanks (468) and (478) respectively. This ensures a quick start-up of the system, e.g., in the storage mode. Additionally, the tank (478) improves the storage capability of the system if kept at $T_1$, since the sensible heat of the absorbent liquid in this tank contributes to the storage capacity during heat output.

Preferred is the regulation of the output power without use of the valves in the vapor flow pipes. The system is preferably regulated by adjusting the temperature of the absorbent liquid in the desorber. At higher temperature, the working fluid pressure in the desorber is higher. Consequently, the solid adsorbent in the adsorber/generator adsorbs more working fluid vapor and liberates heat which is obtainable at temperature $T_1$.

Further, the following devices can be advantageously included in the heat pump system:

A regulating valve (244) in the pipe (162) which is connected to the pipe (164) by the pipe (246) is especially useful if the temperature of the heat source varies.

Similarly, the temperature in the desorber (404) can be regulated by a three-way valve (212). Further, the flow of the heat transfer medium in the adsorber/generator (102), (104) can be regulated during heat extraction. The temperatures in the adsorber/generator (102), (104) have rather high variations. The heat sink (user) in general needs heat at a constant temperature. Advantageously, the regulating valve (460) is used to regulate the flow of heat transfer medium through the adsorber/generator (102), (104) such that the temperature $T_1$ is reached after passing through the resorber (406) and subsequently the absorber/generator (102), (104) or the bypass pipe (429).

The preferred version of the adsorber/generators (102), (104) is obtained by integrating each adsorber/generator with a desorber. In this way the pressure drop between the adsorber/generator (102) (104) and the desorber is minimized. A large cross sectional area of the connection between adsorber/generator and the desorber is necessary since the working fluid pressure is low during adsorption and large volumes of vapor have to be moved. To avoid large valves between the desorber (384) and the adsorber/generators (102), (104) a provision is made to empty the desorber of all absorbent liquid during the desorption of working fluid in the adsorber/generator. This can be a drain pipe (414), (484) (and, if necessary, a pump (426)) which leads to the storage tank (478).

Preferred is a construction which includes the heat exchangers (494) and (492) in the desorber (404a) and the resorber (406). In this way the temperature differences between the liquid entering the open space in (406) and (404) and the heat transfer fluid in the corresponding heat exchanger (420) and (424) are minimized.

A preferred version of the heat pump includes a rectifier (456) in the pipe (124) from the desorber (404) to the adsorber/generator (102), (104). The rectification may be necessary if an absorbent liquid with a non-negligible vapor pressure of the absorbent is used. The rectifier can be cooled, e.g., by a separate heat transfer loop with a heat exchanger (458) at a temperature $T_4$, where $T_4$ is smaller than $T_0$. The condensate of the rectifier can be returned to the pipe (414) between the desorber (404) and the resorber (406).

For further reference, the U.S. patent application Ser. No. 707,665 "Method and Device for Upgrading Heat and Heat Transformer" filed on even date herewith is noted.

Examples:

As a comparison, the c.o.p. and the total concentration change (=capacity) of working fluid per adsorption cycle is given for different versions of solid adsorbent systems.

The following definitions are used:

$$\text{cop} := \frac{\text{output heat at intermediate temperature } T_1}{\text{input heat at high temperature } T_2}$$

$$\text{capacity} := \frac{\text{mass of working fluid adsorbed in one cycle}}{\text{mass of solid adsorbent, dry, in one adsorber/generator}}$$

As adsorbent zeolite A was used with water as working fluid.

The maximum pressure used was 1 bar absolute.

EXAMPLE 1

Heat pump with solid adsorbent in two adsorber/generators which are operated out of phase (in opposite phases). The hard-ware is shown in FIG. 4. Use of condensation and evaporation (without absorbent liquid).

Pressures: $p_0 = 0.01$ bar $p_1 = 1$ bar

Temperatures: $T_0 = 10°$ C.; $T_1 = 100°$ C.; $T_2 = 300°$ C.

(a) for comparison the values for heat pump operation according to patent application DE-OS No. 29 39 423:
cop = 1.31; capacity = 0.09
pressure—temperature path in FIG. 2: A'-C-E'-G-A'

(b) use of the method of internal heat exchange with a heat transfer medium between the two adsorber/generators:
cop = 1.43; capacity = 0.09
pressure—temperature path in FIG. 2: A'-C-K-E'-G-L-A'

(c) use of a pressure equalization (internal mass transfer) step without subsequent internal heat transfer by a heat transfer loop:
cop = 1.39; capacity = 0.11
pressure—temperature path in FIG. 2: A-C-D-E-G-H-A (d) use of a pressure equalization step followed by heat transfer between the two adsorber/generators via a heat transfer loop:
cop = 1.46; capacity = 0.11
pressure—temperature path in FIG. 2: A-B-C-D-E-F-G-H-A

EXAMPLE 2

Heat pump with a solid adsorbent in two adsorber/generators which operate out of phase (in opposite phases) (e.g. a system as shown in FIG. 4) with resorption and desorption of the working fluid in an absorbent liquid circulating between the desorber and resorber.

pressures: $p_0 = 0.1$ bar; $p_1 = 1$ bar temperatures: $T_0 = 80°$ C.; $T_1 = 140°$ C.; $T_2 = 300°$ C.

cop = 1.47; capacity = 0.12

This c.o.p. applies to a system which is operated according to the preferred methods of this application, that means including the internal heat and mass transfer step. Without application of the internal heat and mass transfer the values of the c.o.p. and the capacity are reduced approximately by the same amount as in example 1.

Summary of the Examples:

() The use of the procedure of internal heat exchange results in an improvement of the cop of about (typical values):

$$\frac{1.46 - 1.31}{1.31} = 11.5\%$$

and the capacity is improved by $$\frac{0.11 - 0.09}{0.09} = 22\%$$

(2) The use of a system with resorber and desorber facilitates an increase of the heat output temperature from 100° C. to 140° C. without increase of the pressure. A further increase of the output temperature is possible.

The invention concerns a method for increasing the temperature of heat and a device for the realization of this method. By supplying heat at a temperature $T_2$ to a solid adsorbent, a working fluid is desorbed from this adsorbent at a relatively high pressure. The evolving gaseous working fluid is transformed to a liquid phase at a temperature $T_1'$ ($T_1'$ $T_2$) while liberating heat. The working fluid is then transformed to the gaseous phase at a lower temperature $T_0$ and a low pressure $p_0$ while heat is supplied. The generated gaseous working fluid is adsorbed in a second adsorber/generator in a solid adsorbent. The adsorber/generators periodically change between the adsorption and desorption phase and are operated in opposite phases.

Before an interchange of the function of the two adsorber/generators, an internal heat exchange is carried out. The internal heat exchange includes a pressure equalization step with a subsequent heat transfer by a heat transfer loop. The use of an absorbent fluid leads to a resorption system which facilitates an optimization of the pressure levels used in the system.

TABLE 1

Valve positions, pump conditions, temperatures and pressures in the heat pump according to FIG. 3 with two adsorber/generators, internal heat exchange and pressure equalization step and with adsorption/desorption during the internal heat exchange step (step 4 and 8).

| Vorgang | ↓→ | pipe connections | | | | valve conditions | | | | | | pump conditions | | | | |
|---|---|---|---|---|---|---|---|---|---|---|---|---|---|---|---|---|
| | | 158 | 156 | 154 | 160 | 150 | 136 | 138 | 140 | 142 | 428 | 152 | 196 | 416 | 426 | 184 |
| 1. Generating | 162 | — | — | x | — | — | — | 0 | 0 | — | — | — | 0 | 0 | 0 | 0 |
| in (102) + | 164 | — | — | — | x | | | | | | | | | | | |
| adsorbing | 166 | — | x | — | — | | | | | | | | | | | |
| in (104) | 168 | x | — | — | — | | | | | | | | | | | |
| 2. Pressure equalization | | | | | | 0 | — | — | — | — | — | — | — | — | — | — |
| 3. Internal | 158 | — | — | — | x | — | — | — | — | — | — | 0 | — | — | — | — |
| heat exchange | 156 | — | — | x | — | | | | | | | | | | | |
| 4. Adsorption | 158 | — | — | — | x | — | 0 | — | — | 0 | 0 | 0 | — | 0 | 0 | 0 |
| in (102) + | 156 | — | — | x | — | | | | | | | | | | | |
| generating in (104) | | | | | | | | | | | | | | | | |
| 5. Generating | 162 | — | x | — | — | — | 0 | — | — | 0 | — | — | 0 | 0 | 0 | 0 |
| in (104) + | 164 | x | — | — | — | | | | | | | | | | | |
| adsorbing | 166 | — | — | x | — | | | | | | | | | | | |
| in (102) | 168 | — | — | — | x | | | | | | | | | | | |

6. ... 7. ... 8. ... follow by exchanging (102) and (104) and the corresponding auxiliary devices in phase 2, 3, 4

| temperatures | pressures | conc. | path in FIG. |
|---|---|---|---|

TABLE 1-continued

Valve positions, pump conditions, temperatures and pressures in the heat pump according to FIG. 3 with two adsorber/generators, internal heat exchange and pressure equalization step and with adsorption/desorption during the internal heat exchange step (step 4 and 8).

| Vorgang | 102 | 104 | 404 | 406 | 102 | 104 | 404 | 406 | 102 | 104 | 102 | 104 |
|---|---|---|---|---|---|---|---|---|---|---|---|---|
| 1. Generating in (102) + adsorbing in (104) | $T_F$ $T_2$ | $T_B$ $T_1$ | $T_o$ | $T_1'$ | $p_1$ | $p_o$ | $p_o$ | $p_1$ | $x_F$ $x_G$ | $x_B$ $x_C$ | F G | B C |
| 2. Pressure equalization | $T_2$ $T_H$ | $T_1$ $T_D$ | $T_o$ | $T_1'$ | $p_1$ $p_H$ | $p_o$ $p_D$ | $p_o$ $p_1$ | $p_1$ $p_1$ | $x_G$ $x_H$ | $x_C$ $x_D$ | G H | C D |
| 3. Internal heat exchange | $T_H$ $T_A$ | $T_D$ $T_E$ | $T_o$ $T_o$ | $T_1'$ $T_1'$ | $p_H$ $p_o$ | $p_D$ $p_1$ | $p_o$ $p_o$ | $p_1$ $p_1$ | $x_H$ $x_A$ | $x_D$ $x_E$ | H A | D E |
| 4. Adsorption in (102) + generating in (104) | $T_A$ $T_B$ | $T_E$ $T_F$ | $T_o$ $T_o$ | $T_1'$ $T_1'$ | $p_o$ $p_o$ | $p_1$ $p_1$ | $p_o$ $p_o$ | $p_1$ $p_1$ | $x_A$ $x_B$ | $x_E$ $x_F$ | A B | E F |
| 5. Generating in (104) + adsorbing in (102) | $T_B$ $T_1$ | $T_F$ $T_2$ | $T_o$ $T_o$ | $T_1'$ $T_1'$ | $p_o$ $p_o$ | $p_1$ $p_1$ | $p_o$ $p_o$ | $p_1$ $p_1$ | $x_B$ $x_C$ | $x_F$ $x_G$ | B C | F G | x = pipes connected
— = not used, not connected, closed
0 = in use, open

Thus, the several of four noted objects and advantages are most effectively attained. Although several somewhat preferred embodiments have been disclosed and described in detail herein, it should be understood that this invention is in no sense limited thereby and its scope is to be determined by that of the appended claims.

I claim:

1. A method of increasing the temperature of heat using a working fluid which is desorbed at a working fluid pressure $p_1$ from a solid adsorbent contained in at least one adsorber/generator while supplying heat at a high temperature $T_2$, where said working fluid is transformed from the vapor to a liquid phase at an intermediate temperature $T_1$ while liberating heat, where the liquid phase of said working fluid is transformed to a gaseous phase at low working fluid pressure $p_0$ while taking up heat at a low temperature $T_0$, where said gaseous working fluid is adsorbed and liberates heat in at least one further adsorber/generator containing said solid adsorbent, and where the process is continued by alternately desorbing and adsorbing in the two or more adsorber/generators, comprising; an internal heat exchange step used before changing from the adsorption to the desorption phase in the adsorber/generators which includes first a pressure equalization steip between at least one of the adsorber/generators at a higfher working fluid pressure and temperature and one or more other adsorber/generators being at a lower working fluid pressure and temperature and subsequently a heat transfer step from at least one of the adsorber/generators being at higher temperature with higher working fluid concentration to at least one of the adsorber/generators being at a lower temperature at a lower working fluid concentration.

2. A method according to claim 1 wherein an absorbant fluid is in at least one of the containers in which the phase of the working fluid is changed which absorbs working fluid at an intermediate temperature $T_1'$ and at relatively high working fluid pressure $p_1$ and/or desorbs working fluid at a lower working fluid pressure $p_0$ at a low temperature $T_0$.

3. A method according to claim 1 wherein at least one of zeolite and activated carbon is used as solid adsorbent.

4. A method according to claim 1 wherein at least one of water and methanol is used as working fluid.

5. A method according to claim 2 wherein an aqueous salt solution, especially of aqueous solutions of LiBr, LiCl, $CaCl_2$, NaCl, ZnBr or mixtures thereof is used as absorbent liquid in at least one of the containers for changing the phase of the working fluid.

6. A method according to claim 1 wherein there is a reduction of the working fluid pressure $p_1$ during desorption from the solid adsorbent at given temperatures $T_2$ and $T_1$ to a pressure which is low enough to permit the use of the selected adsorbent for a certain number of cycles without deterioration of the adsorbent quality.

7. A method according to claim 6 wherein there is a maximum working fluid pressure of 1 bar absolute and adsorber/generators with thin walls which are supported against the outside pressure by the solid adsorbent inside.

8. A method according to claim 2 wherein there is modification of the working fluid pressures $p_0$ and $p_1$ by adjusting the working fluid concentration in at least one adsorbent liquid such that the mass of working fluid adsorbed per adsorption cycle is maximized for given temperatures $T_0$, $T_1$, $T_2$.

9. A method according to claim 2 wherein there are two independent adsorbent fluids used in the containers for changing the phase of the working fluid, where the first absorbent liquid is heated at a temperature $T_0$ while or before desorbing working fluid from it, while the second absorbent liquid is cooled at a temperature $T_1$ while or after it absorbs working fluid.

10. A method according to claim 9 wherein there is the use of at least one of the two absorbent liquids in a chemical process in which heat is transferred and/or solutions are concentrated or diluted.

11. A method according to claim 1 wherein there is an exchange or working fluid between the solid adsorbent in at least one of an exchange of working fluid between the solid absorbent in at least one of the adsorber/generators and at least one of the containers for changing the phase of the working fluid during at part of the time of the internal heat exchange by heat transfer.

12. A method according to claim 1 wherein there is an arrangement in which the direction of the working fluid vapor flow during the adsorption in the solid adsorbent is opposite to the direction of the heat transfer medium flow in the heat exchanger embedded in said adsorbent.

13. A method according to claim 1 wherein there is external heat exchange with the absorbent liquid(s) used in the containers for changing the phase of the working fluid.

14. A method according to claim 2 wherein there is a regulation of the temperature of the container for changing the phase of the working fluid at lower working fluid pressure (the desorber or evaporator) which regulates the power output at the temperature $T_1$.

15. A method according to claim 1 wherein there is a sectionwise use of the heat exchangers in the absorber/generators during the adsorption and/or desorption phase.

16. A method according to claim 1 wherein there are subdivided adsorber/generators with sections which can be subjected to different working fluid pressures during adsorption or desorption.

17. A device used in increasing the temperature of heat using a working fluid which is desorbed at a working fluid pressure $p_1$ from a solid adsorbent contained in at least one adsorber/generator while supplying heat at a high temperature $T_2$ where said working fluid is transformed from the vapor to a liquid phase at an intermediate temperature $T_1$, while liberating heat, where the liquid phase of said working fluid is transformed to a gaseous phase at low working fluid pressure $p_0$ while taking up heat at a low temperature $T_0$, where said gaseous working fluid is adsorbed and liberates heat in at least one further adsorber/generator containing said solid adsorbent, and where the process is continued by alternately desorbing and adsorbing in the two or more adsorber/generators, and where an internal heat exchange step is used before changing from the adsorption to the desorption phase in the adsorber/generators which includes first a pressure equalization step between at least one of the adsorber/generators at a higher working fluid pressure and temperature and one or more other adsorber/generators being at a lower working fluid pressure and temperature and subsequently a heat transfer step from at least one of the adsorber/generators being at higher temperature with higher working fluid concentration to at least one of the adsorber/generators being at a lower temperature at a lower working fluid concentration, comprising; at least 2 adsorber/generators containing a solid adsorbent and a provision for heat exchange between said solid adsorbent and a heat transfer fluid with, containers for transforming the phase of working fluid from vapor to liquid and from liquid to vapor, with a working fluid which can be adsorbed and desorbed in said solid adsorbent, with heat exchange means for phase change heat in said containers, an absorbent liquid in at least one of the two containers (352), (354), (404), (406) for transforming the phase of the working fluid and a pipe connection (148) between the two adsorber/generators (102) and (104) with a valve (150) in this pipe and a heat exchange loop consisting of a valve arrangement (192), the pipes (154), (156), (158), (160), the pump (152) and the heat exchangers (106), (108) between the two adsorber/generators.

18. A device according to claim 17 wherein there is a loop for adsorbent liquid between the container (352), (404) for transforming the phase of the working fluid at a low working fluid pressure $p_0$ from a liquid to a gaseous phase and the container (354), (406) for the transformation of the working fluid vapor to a liquid, including a pipe (414) for absorbent liquid with low working fluid concentration from the desorber to a solution heat exchanger (176), a pipe (410) from the solution heat exchanger (176) to the resorber, a pipe (408) for absorbent liquid with high working fluid concentration from the resorber to the solution heat exchanger (176), a pipe (412) with an expansion device (180) from the solution heat exchanger to the desorber and a pump (426) in this loop.

19. A device according to claim 17 wherein there is a regulating valve (244) in the pipe (162) from the heat source (388) to the adsorber/generators (102), (104) which is used for regulating the heat input power at high temperature $T_2$ and which is connected to the return pipe (164) from the adsorber/generators to the heat source (388) via a pipe (246), and/or;

a regulating valve (212) in the pipe (186) from the heat source (384) to the heat exchanger element (424) in the desorber (404) which is connected via the pipe (236) to the return pipe (113) from the heat exchanger element (424) to the heat source (383), and/or;

a regulating valve (460) in the pipe (166) between the heat sink (user) (386) and the desorber/generators (102) and (104) which is connected to the pipe (168) via a pipe (168).

20. A device according to claim 17 wherein there is a valve arrangement (192) in the heat transfer loops between the heat source (388), the heat sink (386) and the heat exchangers (106), (108) in the adsorber/generators (102) and (104), which connects (106) and (108) alternately with the heat sink (user) (388) and the heat source (386) at $T_2$ or with (388) and (386) respectively.

21. A device according to claim 17 wherein there is integration of a desorber (404), (352) into each adsorber/generator (102), (104) and a provision for draining the absorbent liquid from the desorber (352), (404).

22. A device according to claim 17 wherein there is a resorber (404) and/or a desorber (402) which are constructed as exchange columns.

23. A device according to claim 17 wherein there are storage tanks (478) (468) for the storage of absorbent liquid with high and low working fluid concentration, respectively, which are included in the pipes (412) and/or (410) between the solution heat exchanger (176) and the resorber (406) and between the solution heat exchanger (176) and the desorber (404), respectively and which can be heated or cooled by means of heat exchangers (470) and (480).

24. A device according to claim 17 wherein there is an external heat exchanger (360), (380) in at least one of the pipes to the desorber (352), (404) and the resorber (354), (406), respectively, which serve for heat exchange with the heat source (384) or the heat sink (386), respectively.

25. A device according to claim 17 wherein there are heat exchangers (492), (494) in the resorber (354), (406) and/or the desorber (352), (404) which connect to the pipes (410) and (412), respectively.

26. A device according to claim 17 wherein there is a rectifier (456) in the pipe (124) from the desorber (404), (352) to the adsorber/generator (102), (104).

* * * * *